United States Patent
Ifergan et al.

(10) Patent No.: US 7,033,019 B2
(45) Date of Patent: *Apr. 25, 2006

(54) EYEGLASS DEVICE

(75) Inventors: Thierry Ifergan, Aventura, FL (US); Jean Pierre Sam, Kirkland (CA)

(73) Assignee: Chic Optic Inc., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/856,938

(22) Filed: Jun. 1, 2004

(65) Prior Publication Data

US 2005/0036099 A1  Feb. 17, 2005

Related U.S. Application Data

(63) Continuation of application No. 09/669,492, filed on Sep. 25, 2000, now Pat. No. 6,758,561.

(60) Provisional application No. 60/155,996, filed on Sep. 24, 1999.

(51) Int. Cl.
*G02C 9/00* (2006.01)

(52) U.S. Cl. .............................. 351/47; 351/57; 351/111

(58) Field of Classification Search ................. 351/47, 351/48, 57, 58, 124, 126, 111
See application file for complete search history.

(56) References Cited

U.S. PATENT DOCUMENTS

| | | | |
|---|---|---|---|
| 1,679,233 A | 7/1928 | Strauss |
| 2,737,847 A | 3/1956 | Tesauro |
| 2,770,168 A | 11/1956 | Tesauro |
| 3,498,701 A | 3/1970 | Miller |
| 3,531,188 A | 9/1970 | Leblanc et al. |
| 3,531,190 A | 9/1970 | Leblanc |
| 3,536,385 A | 10/1970 | Johnston |
| 3,565,517 A | 2/1971 | Gitlin et al. |
| 3,582,192 A | 6/1971 | Gitlin |
| 3,838,914 A | 10/1974 | Fernandez |
| 3,917,940 A | 11/1975 | Duddy |
| 4,070,103 A | 1/1978 | Meeker |
| 4,070,105 A | 1/1978 | Marzouk |
| 4,196,981 A | 4/1980 | Waldrop |
| 4,217,037 A | 8/1980 | Lemelson |
| 4,547,909 A | 10/1985 | Bell |
| 4,750,828 A | 6/1988 | Sartor |
| 4,896,787 A | 1/1990 | Delamour et al. |
| 4,932,771 A | 6/1990 | Nowottny |
| 4,988,181 A | 1/1991 | Riach, Jr. |
| 5,009,495 A | 4/1991 | Williams |

(Continued)

FOREIGN PATENT DOCUMENTS

CA 2216280 8/1996

(Continued)

*Primary Examiner*—Huy Mai
(74) *Attorney, Agent, or Firm*—Ralph A. Dowell; Dowell & Dowell P.C.

(57) ABSTRACT

An eyeglass device comprised of a primary eyeglass frame and an auxiliary eyeglass frame, each containing lenses therein. The primary eyeglass frame includes a bridge and earpieces, which are connected to extensions on each side of the frame. The bridge may made of a flexible memory alloy, such as NiTi or CuAlBe. The extensions have magnets mounted on the undersides of them. The auxiliary eyeglass frame also includes a bridge and temporal extensions. These extensions have magnets mounted to the tops of them. The magnets engage magnetically with each other to connect the auxiliary eyeglass frame to the primary eyeglass frame. The flexible bridges of the primary and auxiliary eyeglass frames assist in preventing the auxiliary eyeglass frame from becoming dislodged from the primary eyeglass frame in case it jostled by the wearer because they can withstand slight distortion.

5 Claims, 5 Drawing Sheets

U.S. PATENT DOCUMENTS

| | | | |
|---|---|---|---|
| 5,115,540 A | 5/1992 | Delorme | |
| 5,181,051 A | 1/1993 | Townsend et al. | |
| 5,243,366 A | 9/1993 | Blevins | |
| 5,321,442 A | 6/1994 | Albanese | |
| 5,389,981 A | 2/1995 | Riach, Jr. | |
| 5,410,763 A | 5/1995 | Bollé | |
| 5,416,537 A | 5/1995 | Sadler | |
| 5,431,506 A * | 7/1995 | Masunaga | 403/271 |
| 5,568,207 A | 10/1996 | Chao | |
| 5,583,588 A | 12/1996 | Chao | |
| 5,592,243 A | 1/1997 | Chao | |
| 5,627,608 A | 5/1997 | Chao | |
| 5,631,719 A | 5/1997 | Chao | |
| 5,640,217 A | 6/1997 | Hautcoeur et al. | |
| 5,642,177 A | 6/1997 | Nishioka | |
| 5,651,146 A | 7/1997 | Chao | |
| 5,682,222 A | 10/1997 | Chao | |
| 5,689,835 A | 11/1997 | Chao | |
| 5,696,571 A | 12/1997 | Spencer et al. | |
| 5,737,054 A | 4/1998 | Chao | |
| 5,786,880 A | 7/1998 | Chao | |
| 5,805,259 A | 9/1998 | Chao | |
| 5,815,899 A | 10/1998 | Chao | |
| 5,877,838 A | 3/1999 | Chao | |
| 5,882,101 A | 3/1999 | Chao | |
| 5,883,688 A | 3/1999 | Chao | |
| 5,883,689 A | 3/1999 | Chao | |
| 5,889,575 A | 3/1999 | Wang | |
| 5,894,335 A | 4/1999 | Hoffman | |
| 5,929,964 A | 7/1999 | Chao | |
| 5,936,700 A | 8/1999 | Masunaga | |
| 5,940,162 A | 8/1999 | Wong | |
| 5,975,691 A | 11/1999 | Ku | |
| 5,980,036 A * | 11/1999 | Solomon | 351/47 |
| 6,012,811 A | 1/2000 | Chao et al. | |
| 6,092,896 A | 7/2000 | Chao et al. | |
| 6,109,747 A | 8/2000 | Chao | |
| 6,116,730 A | 9/2000 | Kwok | |
| 6,116,732 A | 9/2000 | Xiao | |
| 6,132,040 A | 10/2000 | Xiao | |
| 6,139,141 A * | 10/2000 | Zider | 351/57 |
| 6,139,142 A | 10/2000 | Zelman | |
| 6,149,269 A | 11/2000 | Madison | |
| 6,164,774 A | 12/2000 | Cate | |
| 6,168,341 B1 | 1/2001 | Chene et al. | |
| 6,170,948 B1 | 1/2001 | Chao | |
| 6,170,949 B1 | 1/2001 | Mauch | |
| 6,231,179 B1 | 5/2001 | Lee | |
| 6,264,323 B1 | 7/2001 | Chao | |
| 6,270,274 B1 | 8/2001 | Chao | |
| 6,305,799 B1 | 10/2001 | Chao | |
| RE37,545 E | 2/2002 | Chao | |
| 6,367,926 B1 | 4/2002 | Chao et al. | |
| 6,375,321 B1 | 4/2002 | Lee et al. | |
| 6,412,942 B1 | 7/2002 | McKenna et al. | |
| 6,474,810 B1 * | 11/2002 | Ng | 351/47 |
| 6,488,372 B1 | 12/2002 | Park | |
| 6,550,913 B1 * | 4/2003 | Zelman | 351/57 |
| 6,585,370 B1 | 7/2003 | Zelman | |
| 6,601,953 B1 | 8/2003 | Xiao | |
| 2001/0036170 A1 | 11/2001 | Xiao | |
| 2002/0093622 A1 | 7/2002 | Tostado | |

FOREIGN PATENT DOCUMENTS

| | | | |
|---|---|---|---|
| CA | 2180714 | | 8/1997 |
| CA | 2235088 | | 10/1998 |
| CA | 2235802 | | 10/1998 |
| CA | 2235818 | | 10/1998 |
| CA | 2235823 | | 10/1998 |
| CA | 2235826 | | 10/1998 |
| CA | 2286765 | | 10/1998 |
| CA | 2313976 | | 10/1998 |
| CA | 2372382 | | 10/1998 |
| CA | 2236025 | | 4/1999 |
| CA | 2223295 | | 7/1999 |
| CA | 2235917 | | 8/1999 |
| CA | 2235897 | | 12/1999 |
| CA | 2274221 | | 12/1999 |
| CA | 2292390 | | 4/2000 |
| CA | 2269373 | | 5/2000 |
| CA | 2302540 | | 6/2000 |
| CA | 2337146 | | 6/2000 |
| CA | 2235798 | | 7/2000 |
| CA | 2258142 | | 3/2001 |
| CA | 2235466 | | 2/2002 |
| CA | 2367159 | | 9/2002 |
| CH | 572 222 | | 1/1976 |
| CN | 107096 | | 1/1989 |
| CN | 1117593 | A | 2/1996 |
| CN | 274588 | | 4/1996 |
| DE | 1797366 | | 1/1971 |
| DE | G85 07 761.5 | U1 | 6/1985 |
| DE | G88 06 898.6 | U1 | 10/1988 |
| DE | 3 905 041 | A1 | 8/1990 |
| DE | 3 919 489 | A1 | 12/1990 |
| DE | 3 920 879 | A1 | 1/1991 |
| DE | 3 921 987 | A1 | 1/1991 |
| DE | 3 933 310 | A1 | 1/1991 |
| DE | G92 16 919.8 | U1 | 4/1993 |
| DE | 4 316 698 | A1 | 11/1994 |
| DE | 29518590 | U1 | 3/1996 |
| DE | 29516670 | U1 | 5/1996 |
| DE | 19543346 | C1 | 1/1997 |
| DE | 19649694 | A1 | 6/1998 |
| EP | 0469699 | A1 | 2/1992 |
| EP | 0743545 | A1 | 11/1996 |
| EP | 0773463 | A1 | 5/1997 |
| EP | 0848276 | A1 | 6/1998 |
| EP | 0773463 | B1 | 12/1998 |
| EP | 0881517 | A1 | 12/1998 |
| EP | 1184711 | A1 | 3/2002 |
| EP | 0877279 | B1 | 6/2004 |
| FR | 0 915 421 | | 11/1946 |
| FR | 1 037 755 | | 9/1953 |
| FR | 1 061 253 | | 4/1954 |
| FR | 1 266 652 | | 6/1961 |
| FR | 2 483 632 | | 12/1981 |
| FR | 2 657 436 | | 7/1991 |
| FR | 2 746 151 | | 5/1998 |
| FR | 2 803 920 | | 4/2002 |
| FR | 2 831 677 | | 5/2003 |
| GB | 846425 | | 8/1960 |
| GB | 855268 | | 11/1960 |
| JP | 44-15392 | | 4/1966 |
| JP | 54-111841 | A2 | 9/1979 |
| JP | 54-111842 | A2 | 9/1979 |
| JP | 55-50217 | | 4/1980 |
| JP | 56-29209 | | 3/1981 |
| JP | 57-184910 | | 11/1982 |
| JP | 61-2621 | | 1/1986 |
| JP | 01-136114 | | 5/1989 |
| JP | 02-109325 | | 8/1990 |
| JP | 05-40493 | | 8/1990 |
| JP | 05-157997 | A2 | 6/1993 |
| JP | 03-011174 | | 3/1995 |
| JP | 07-128620 | A | 5/1995 |
| JP | 07-156856 | | 5/1995 |
| JP | 08-153172 | | 5/1996 |
| JP | 03-031881 | | 9/1996 |
| JP | 09-101489 | A2 | 4/1997 |
| JP | 09-105889 | | 4/1997 |
| JP | 09-138374 | | 5/1997 |
| KR | 20-0280494 | | 6/2002 |

| | | | | | |
|---|---|---|---|---|---|
| NZ | 518317 | 1/2004 | WO | WO 01/13163 A1 | 2/2001 |
| SU | 220885 | 6/1968 | WO | WO 01/22153 A1 | 3/2001 |
| WO | WO 90/09611 | 8/1990 | | | |
| WO | WO 99/15931 | 5/1999 | | | |

* cited by examiner

EYEGLASS DEVICE

This application is a continuation of U.S. application Ser. No. 09/669,492 which claims priority from U.S. Application No. 60/155,996.

FIELD OF THE INVENTION

The present invention relates to an eyeglass device comprising auxiliary eyeglasses, which are attached to primary eyeglasses by magnetic or mechanical engagement.

BACKGROUND OF THE INVENTION

With eyeglass clips which are attached by means of conventional attachments, the clips may become disengaged by torsion. As the frame is twisted or turned in any axial, radial or other direction, the clips will become dislodged from the primary frame, thus falling off or, at a minimum, becoming out of alignment and perhaps partially disconnected from the primary frame. To address this problem the rigidity of the primary frame must therefore be balanced, so as not to deform too much when subjected to various types of torsion. This has been true of primary frames used in association with both of magnetic and non-magnetic auxiliary frames. Today, frames are commonly manufactured with more flexible materials.

Another alternative has been to have an auxiliary eyeglass frame made out of extremely flexible material. However, auxiliary frame of this type have the disadvantage of being very fragile.

Various types of auxiliary eyeglass frames which contain magnetic material to facilitate adhesion to the primary eyeglass frame have been disclosed in the prior art. U.S. Pat. No. 4,070,103 discloses an eyeglass frame in which the peripheral edges of the primary frame and lens rim covers contain magnetic strips to hold the lens rim cover in place on the primary frame. U.S. Pat. No. 5,416,537 discloses an eyeglass frame which contains magnetic members on the temple of the primary frame which engage a corresponding magnetic member on the temple of the auxiliary frame. U.S. Pat. No. 5,642,177 discloses an auxiliary eyeglass frame which uses the same principle of magnets on the temporal portions as U.S. Pat. No. 5,416,537; however the auxiliary frame disclosed in U.S. Pat. No. 5,642,177 contains a hinge on the bridge of the frame which allows it to be folded. U.S. Pat. No. 5,568,207 discloses an auxiliary frame which contains small extensions on the temporal portions of the frame which secure the auxiliary frame to the primary eyeglass frame in addition to using the principle of magnetic members as disclosed in U.S. Pat. Nos. 5,416,537, 6,012,811 discloses an auxiliary eyeglass frame in which the bridge includes a U-shaped structure having two arms on the top and bottom of the bridge, respectively, with magnets located in respective arms, and the bridge of the primary frame, including its magnetic member, is sandwiched between the two arms.

There are many disadvantages to the eyeglasses described above. The auxiliary eyeglass frame described in U.S. Pat. No. 4,070,103 requires magnetic strips on both the primary and auxiliary frames. The auxiliary eyeglass frame described in U.S. Pat. No. 5,416,537 has the magnets attaching at the top of the primary frame, thus requiring the wearer to be extraordinarily precise in placing the auxiliary frame on the primary frame. The auxiliary eyeglass frame disclosed in U.S. Pat. No. 5,642,177 has front mounted magnets, which may cause the auxiliary frame to separate from the primary frame if jostled by the wearer.

Canadian patent 2,235,798, Canadian application 2,258,142, and U.S. Pat. No. 5,894,335 provide other examples of mechanical and/or magnetic attachment of auxiliary and primary frames.

SUMMARY AND OBJECTS OF THE INVENTION

The primary objective of this present invention is to provide an auxiliary eyeglass frame which securely attaches to a primary eyeglass frame by magnets.

This objective is achieved by a primary and auxiliary eyeglass frame combination comprised of a auxiliary eyeglass frame and a primary eyeglass frame, each containing separate lenses therein. The auxiliary eyeglass frame includes two side portions which are connected by a bridge. Each side portion of the frame has a temporal extension with magnets mounted, preferably, on a top of each extension. The primary eyeglass frame also includes two side portions which are connected by a bridge. The bridges of both the primary and auxiliary frames may be made of a flexible memory alloy, such as NiTi, or CuAlBe similar to that disclosed in U.S. Pat. No. 5,640,217, so that the bridges are more deformable than other parts of the frames. Each side portion has a temporal extension to which temporal members, providing earpieces, are connected. Each temporal extension also has a magnet mounted, preferably, on an underside of the extension. The auxiliary eyeglass frame is secured to the primary eyeglass frame by the magnetic force between the bottom mounted magnets on the primary frame's temporal extensions and the top mounted magnets on the auxiliary frame's temporal extensions. If the bridge of either the primary or auxiliary frame is made of a flexible shape memory alloy, such as NiTi or CuAlBe, it would be less likely that the auxiliary frame will become dislodged if jostled by the wearer because both frames would be able to withstand slight deformation. In other words, a relatively flexible portion linking two more rigid frame parts could deform to absorb an impact on one frame part, preventing the shock being transmitted to the other frame part.

According to another aspect of the invention, magnets may be mounted on one or both frames at any suitable location, such as on one or both bridges, for example, and one or more other, possibly adjacent, locations of one or both frames (where a magnet is not mounted, for example, the temporal extensions or temples), may be made of a flexible shape memory alloy or other suitable flexible material.

Magnetic engagement of primary and auxiliary frame parts may be obtained by provision of cooperating permanent magnets on both frame parts, or by a permanent magnet on only one frame part with a cooperating portion of the other frame part being made of magnetic material functioning as a temporary magnet.

The primary and auxiliary frames may rely for attachment together on magnetic engagement alone, or such magnetic engagement may be supplemented or replaced by mechanical engagement provided, for example, by suitably located clips, pins and sockets or other suitable releasable fastenings, as described in any of the references referred to above, the disclosures of which are incorporated herein by reference.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 6:
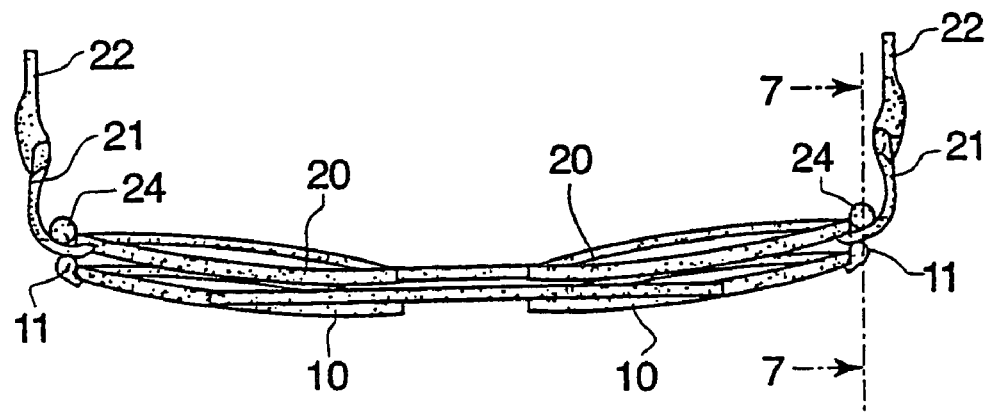
FIG. 6 is a top view of the primary and auxiliary frame combination with nosepieces omitted.

Referring to the drawings, and in particular FIGS. 1–4, a primary and auxiliary frame combination in accordance with the present invention is comprised of a auxiliary eyeglass frame 10 containing a first set of lenses therein and an primary eyeglass frame 20 containing a second set of lenses therein. The auxiliary eyeglass frame 10 includes a bridge 13 and temporal extension 11 on each side. Each temporal extension 11 contains a magnet 12 mounted at a top of the extension 11 in an upwardly protruding through-socket 16 formed at a free end of the extension 11, as shown in FIG. 6. The primary eyeglass frame 20 includes two side portions each having a temporal region with temporal extension 21 to which the temporal members 22, for engaging a wearer's head or ears, are pivotally connected. The primary eyeglass frame 21 also includes a bridge 25. Each temporal extension 21 contains a magnet 24 mounted to the bottom of the extension 21 in a through-socket 23. The bridges 25 and 13 of the primary frame and the auxiliary frame, respectively, are made of a flexible shape memory alloy, such as NiTi or CuAlBe, providing a relatively flexible or deformable link.

Figure 1:
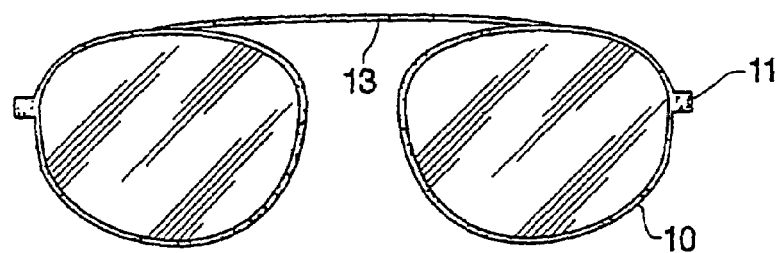
FIG. 1 is a front of the auxiliary eyeglass frame of the present invention.
Figure 2:
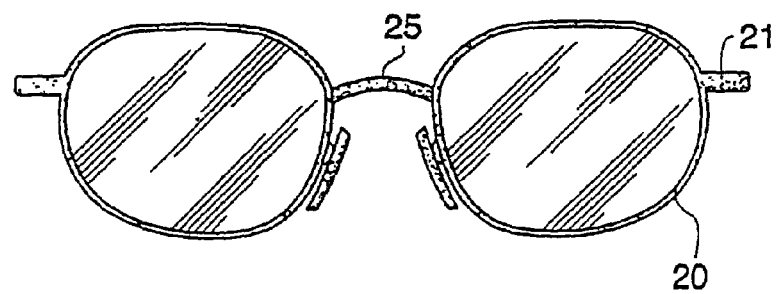
FIG. 2 is a front view of a pair of primary eyeglass frames.
Figure 3:
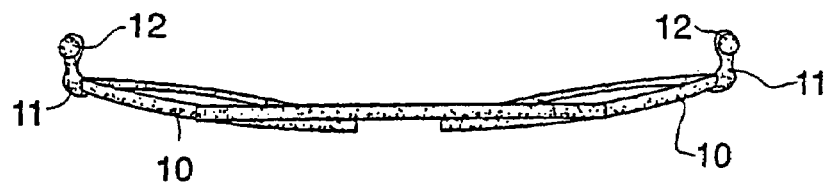
FIG. 3 is a top view of the auxiliary eyeglass frame.
Figure 4:
FIG. 4 is a top view of the primary frame with nosepieces omitted.
Figure 5:
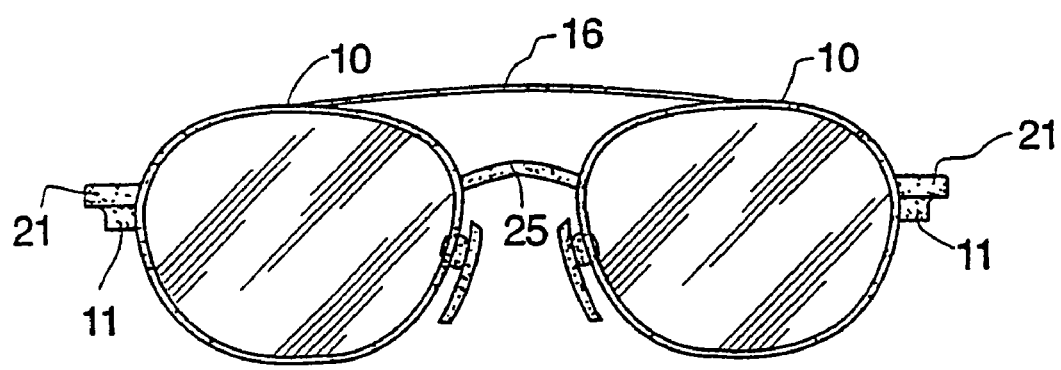
FIG. 5 is a front view of the primary and auxiliary frame combination.

As seen in FIGS. 5 and 6, the auxiliary eyeglass frame 10 is secured in front of the primary eyeglass frame 20 by the magnetic force between magnets 12 and 24. As a result, the auxiliary eyeglass frame 10 is securely mounted from the underside with the second temporal extensions underneath respective first temporal extensions and will not easily be disengaged from the primary eyeglass frame 20. It should be noted that magnets 12 and 24 are not embedded in the temporal extensions 11 and 21. Thus, the temporal extensions are not hollow and are less likely to break.

Figure 7:
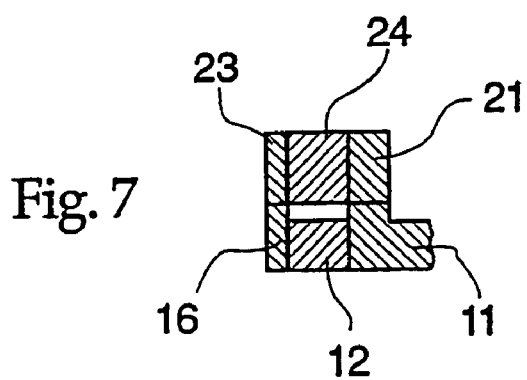
FIG. 7 is a cross sectional view taken along lines 7—7 of FIG. 6 showing the positioning of the magnetic attachment between the primary and auxiliary frames.

FIG. 7 shows the magnetic engagement between the magnets 12 and 24. The temporal extensions are in contact with each other and there is a slight gap between the magnets 12 and 24 with magnet 12 aligned underneath magnet 24. Magnet 12 is slightly recessed into the through-socket 15 of the temporal extension 11, while magnet 24 is mounted flush to the temporal extension. In an alternative embodiment, magnet 12 may be mounted flush to the top of the through-socket 15 of the temporal extension 11 and magnet 24, whilst mounted to the bottom of the temporal extension 21 may be slightly recessed into the through-socket 26 of the temporal extension 21. Thus, the magnets do not come directly into contact with one another, but are close enough to still be attracted. The advantage of not having the magnets come into direct contact is that it prevents them from becoming damaged.

Figure 8:
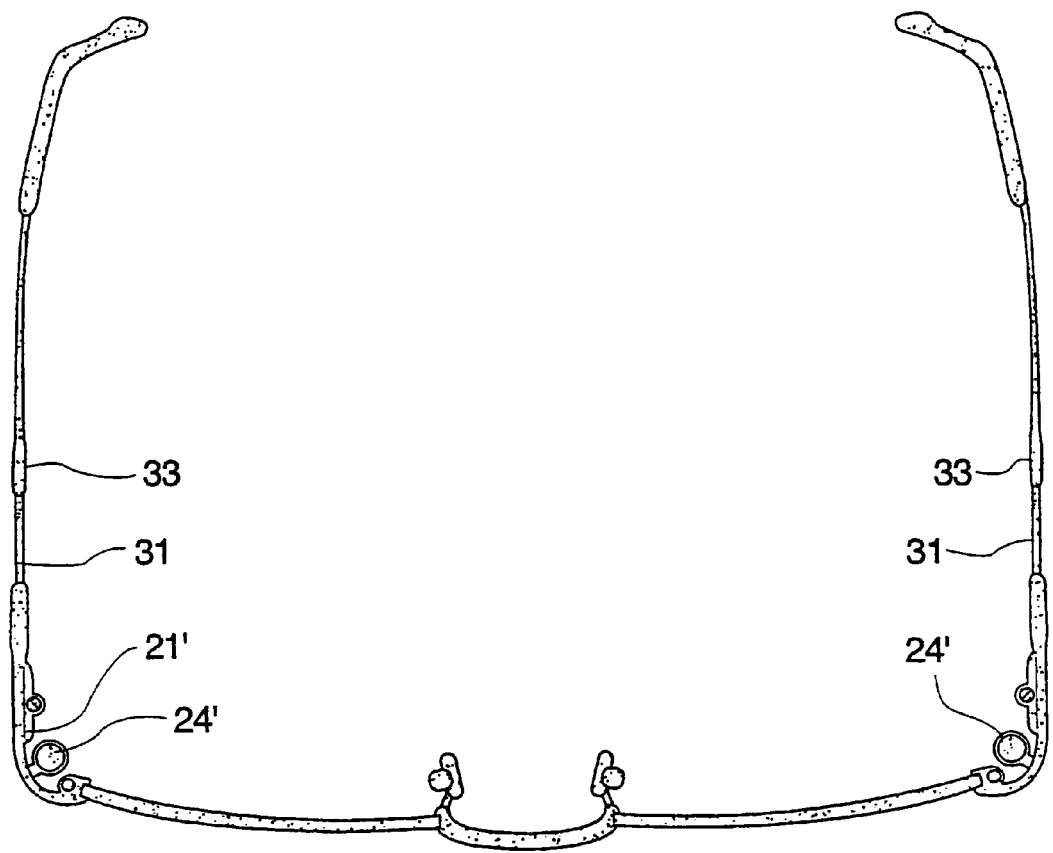
FIG. 8 is a top view of a primary eyeglass frame according to a second embodiment wherein a portion of each temple member extending for only part of the temporal region is formed from flexible shape memory alloy to provide a relatively flexible link.

In the second embodiment shown in FIG. 8, each temple member 22' has a linking portion 31 which is formed from flexible shape memory alloy and extends rearward from a hinge portion 32 for only part of the temporal region, providing a relatively flexible link. Each stem portion 31 is connected to a rearward portion of the temple member and to the hinge portion 32 by receipt and bonding by adhesive or solder in sockets 33 and 34 formed in the rearward portion of the temple member and in the hinge portion, respectively. Permanent magnets 24' (or suitable mechanical fasteners) are mounted on the temporal extensions 21'.

Figure 9:
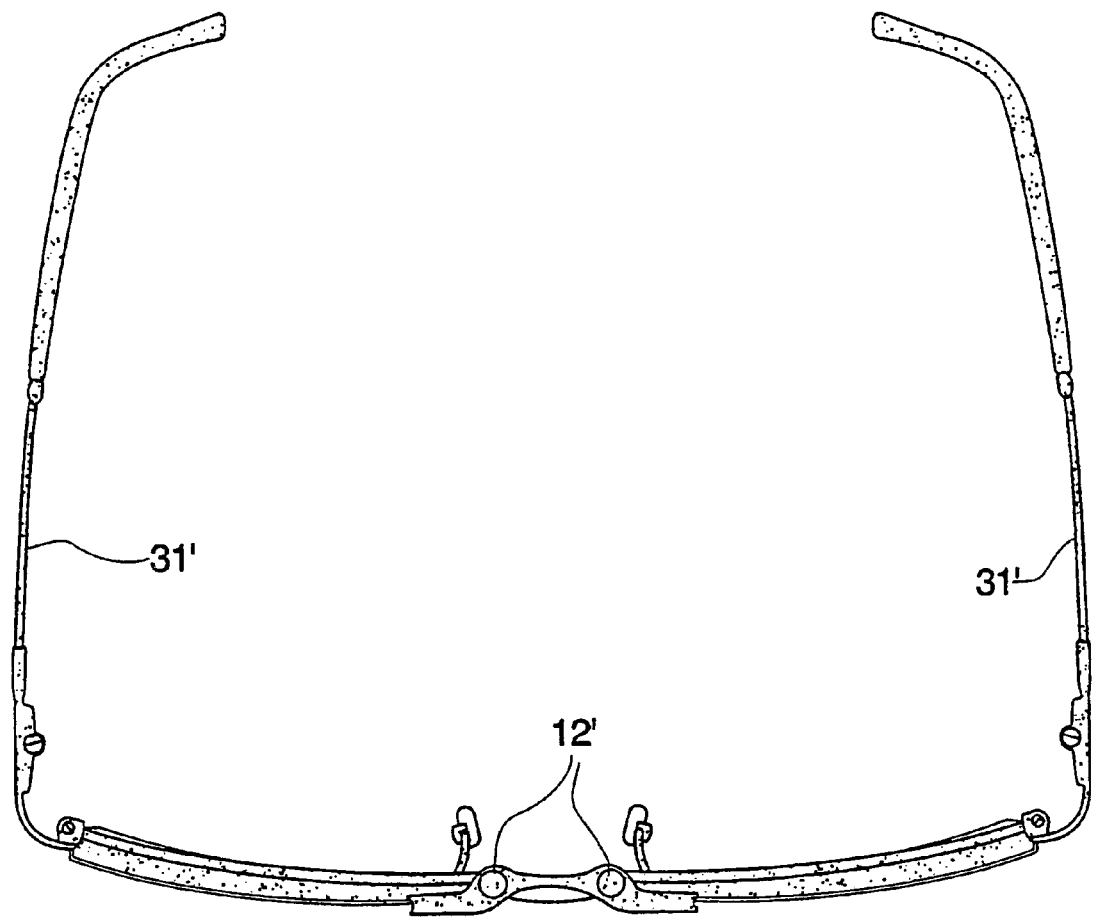
FIG. 9 is a top view of a primary and auxiliary eyeglass frame combination according to another embodiment of the invention wherein a portion of the temple members formed from flexible shape memory alloy extends for substantially the entire the temporal region.
Figure 10:
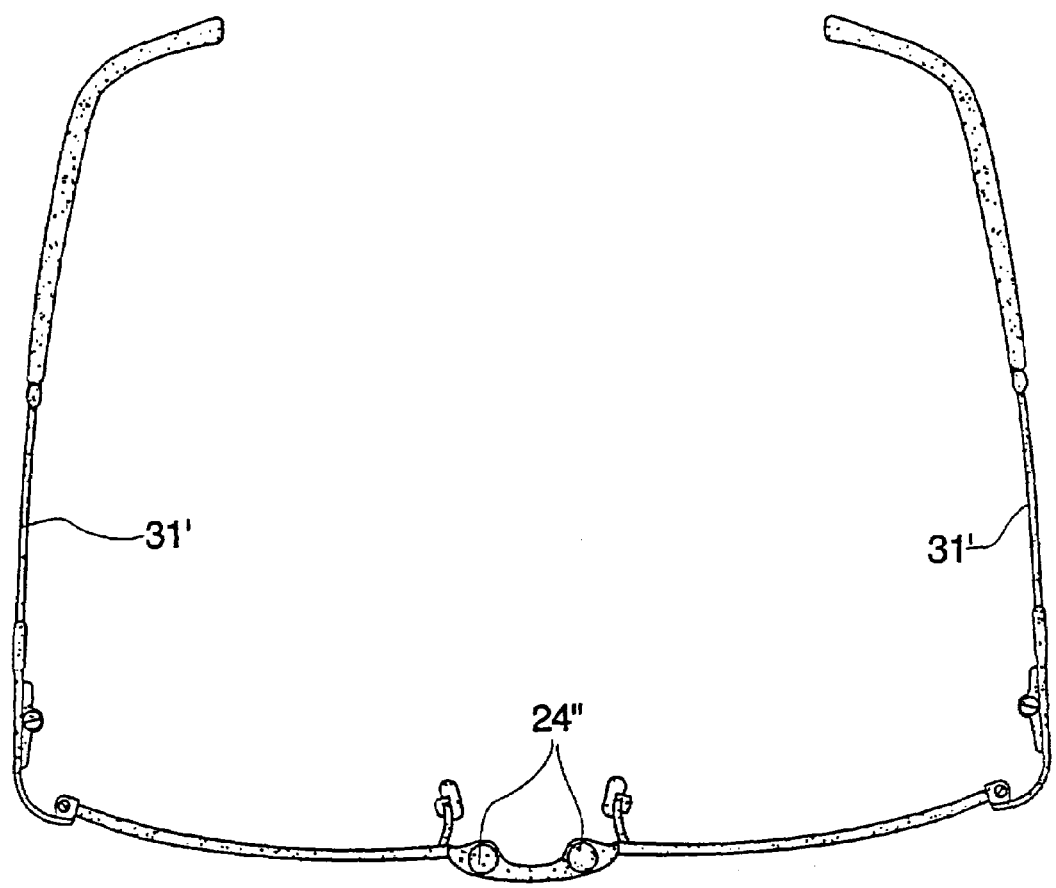
FIG. 10 is a top view of the primary frame of the embodiment shown in FIG. 9.

In the embodiment of FIGS. 8 and 9, a portion 31' of each temple members 22' formed from flexible shape memory alloy extends for substantially the entire temporal region. Permanent magnets 24" and 12" are mounted on the bridge portions of both the primary and auxiliary frames.

While specific embodiments of the invention have been shown and described in detail to illustrate the application of the principles of the invention, it will be understood that the invention may be embodied otherwise without departing from such principles.

What is claimed is:

1. An eyeglass device comprising:
   a primary eyeglass frame having a lens frame for holding a first set of lenses therein and including two first side portions each having a first temporal extension for connecting to a temporal member, each said first side portion carrying a first magnetic member; and
   an auxiliary eyeglass frame having a lens frame for holding a second set of lenses therein and two second side portions each having a second temporal extension carrying a second magnetic member;
   wherein said first magnetic members carried by respective first side portions magnetically engage respective second magnetic members carried by respective second temporal extensions in overlying relation, thereby securing said auxiliary eyeglass frame to said primary eyeglass frame with said second set of lenses aligned with said first set of lenses, and wherein at least a portion of said temporal members is comprised of a flexible shape memory alloy.

2. An eyeglass device, according to claim 1 wherein said flexible shape memory alloy of said temporal members is one of NiTi and CuAlBe.

3. An eyeglass device according to claim 2 wherein the entirety of each said temporal member is comprised of said flexible shape memory alloy.

4. An eyeglass device according to claim 1 wherein the entirety of each said temporal member is comprised of said flexible shape memory alloy.

5. An eyeglass device according to claim 1 wherein said second temporal extensions extend underneath respective first temporal extensions.

* * * * *